(12) United States Patent
Camblor Fernández et al.

(10) Patent No.: US 6,649,141 B2
(45) Date of Patent: Nov. 18, 2003

(54) ZEOLITE ITQ-10

(75) Inventors: Miguel Ángel Camblor Fernández, Valencia (ES); Maria Jose Diaz Cabañas, Valencia (ES)

(73) Assignees: Consejo Superior de Investigaciones Cientificas, Madrid (ES); Universidad Politecnica de Valencia, Valencia (ES)

( * ) Notice: Subject to any disclaimer, the term of this patent is extended or adjusted under 35 U.S.C. 154(b) by 88 days.

(21) Appl. No.: 10/060,116

(22) Filed: Jan. 29, 2002

(65) Prior Publication Data

US 2002/0182145 A1 Dec. 5, 2002

Related U.S. Application Data

(63) Continuation of application No. PCT/ES00/00242, filed on Jul. 7, 2000.

(30) Foreign Application Priority Data

Jul. 29, 1999 (ES) .............................................. 9901847

(51) Int. Cl.[7] .............................................. C01B 39/48
(52) U.S. Cl. ........................ 423/706; 423/707; 423/708; 423/709; 423/718; 423/335
(58) Field of Search ................................ 423/706, 708, 423/718, 335, 709, 707

(56) References Cited

U.S. PATENT DOCUMENTS

| | | | |
|---|---|---|---|
| 4,508,837 A | 4/1985 | Zones | |
| 4,676,958 A | 6/1987 | Zones | |
| 5,340,563 A | 8/1994 | Zones et al. | |
| 5,688,484 A | 11/1997 | Saxton et al. | |
| 6,027,707 A | * 2/2000 | Casci et al. | ................. 423/705 |

FOREIGN PATENT DOCUMENTS

| | | |
|---|---|---|
| ES | 2050400 | 5/1994 |
| WO | WO 98/54091 | 12/1998 |
| WO | WO 99/40026 | 8/1999 |

* cited by examiner

Primary Examiner—David Sample
(74) Attorney, Agent, or Firm—Klauber & Jackson

(57) ABSTRACT

The present invention refers to a microporous rystalline material of zeolitic nature named ITQ-10, to the process of its preparation and to the use of ITQ-10 in processes of separation and transformation of organic compounds.

20 Claims, 1 Drawing Sheet

ZEOLITE ITQ-10

This application is a continuation of International application number PCT ES00/00242, filed Jul. 7, 2000.

TECHNICAL FIELD

Crystalline microporous materials.

BACKGROUND

Zeolites are crystalline microporous materials of varying compositions, characterized by a crystalline network of $TO_4$ tetrahedrons (wherein T represents atoms in a formal oxidation state of +3 or +4 as for example Si, Ti, Al, Ge, B, Ga, . . . ) which share all their vertices, giving rise to a tridimensional structure containing channels and/or cavities of molecular dimensions. When some of the T atoms present an oxidation state lower than +4, the thus formed crystalline network presents negative charges that are compensated by the presence of organic or inorganic cations in the channels or cavities. In said channels, there may also be housed organic molecules and $H_2O$ for which reason, in a general manner, the chemical composition of zeolites may be represented by the following empirical formula:

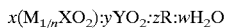

$$x(M_{1/n}XO_2):yYO_2:zR:wH_2O$$

wherein M is one or several organic or inorganic cations of charge +n; X is one or several trivalent elements; Y is one or several tetravalent elements, generally Si; R is one or several organic substances. Although the nature of M, X, Y and R and the values of x, y, z and w may, in general, be varied by means of postsynthesis treatments, the chemical composition of a zeolite (as synthesized or after its calcination) has a characteristic range for each zeolite and for the method by which it has been obtained.

On the other hand, a zeolite is further characterized by it crystalline structure which defines a system of channels and cavities that gives rise to a specific X-ray diffraction pattern. In this manner, zeolites differ in respect of each other by its range of chemical composition plus their X-ray diffraction pattern. Both characteristics (crystalline structure and chemical composition) further determine the physical-chemical properties of each zeolite and its applicability in different industrial processes.

DESCRIPTION OF THE INVENTION

The present invention refers to a crystalline microporous material of zeolitic nature, named ITQ-10, to a method for obtaining it and to the uses thereof.

Such a material is characterized by its chemical composition and by its X-ray diffraction pattern. In its anhydrous and calcinared form, the composition of ITQ-10 can be represented by means of the following empirical formula

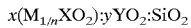

$$x(M_{1/n}XO_2):yYO_2:SiO_2$$

wherein x has a value lower than 0.1 whereby it may be equal to zero; y has a value lower than 0.1 and may as well be equal to zero; M is $H^+$ or an inorganic cation of a charge +n; X is a chemical element with oxidation state +3 (as for example Al, Ga, B, Cr) and Y is a chemical element with oxidation state +4 (as for example Ti, Ge, V). When x=0 and y=0, the material may be described as a new polymorphous form of silica ($SiO_2$) being characterized by its microporous character. In a preferred form of the present invention, in calcinated and anhydrous state, ITQ-10 has the composition $$x(HXO_2):SiO_2$$

wherein X is a trivalent element and x has a value lower than 0.1 and may be equal to zero, in which case the material may be described by means of the formula $SiO_2$. However, depending on the method of synthesis and on its calcination or subsequent treatments, the presence of defects in the crystalline network manifesting themselves in the presence of Si—OH groups (silanols) is possible. These defects have not been included in the previous empiric formulas. In a preferred form of the invention ITQ-10 only has a very low concentration of this kind of defects (silanol concentration lower than 15% in respect of the whole amount of Si atoms, preferably lower than 6%, measured by $^{29}Si$ nuclear magnetic resonance spectroscopy in magic angle).

The X-ray diffraction pattern of ITQ-10 as synthesized by the powder method using a set divergence split is characterized by the following values of interplanar spacings (d) and relative intensities ($I/I_0$):

TABLE 1

| d(Å) | $I/I_0(\%)$ |
|---|---|
| 12.26 | 20 |
| 11.58 | 25 |
| 9.14 | 10 |
| 5.35 | 5 |
| 4.65 | 10 |
| 4.35 | 20 |
| 4.16 | 20 |
| 4.01 | 40 |
| 3.91 | 100 |
| 3.78 | 25 |
| 3.66 | 15 |
| 3.51 | 5 |
| 3.39 | 10 |
| 3.24 | 15 |
| 3.10 | 20 |
| 2.94 | 10 |
| 2.82 | 10 |
| 2.62 | 5 |
| 2.49 | 5 |
| 2.35 | <5 |

The positions, widths and relative intensities of the peaks depend to a certain extent on the chemical composition of the material (the pattern represented in Table I refers only to materials the network of which is composed exclusively of silicon oxide, $SiO_2$ or and synthesized using a quaternary ammonium cation as structure directing agent). Furthermore, the calcination gives rise to significant changes in the X-ray diffraction pattern, due to the elimination of organic compounds that have been retained in the pores of the zeolite during synthesis, so the diffraction pattern of calcinated ITQ-10 of the composition $SiO_2$ is represented. In FIG. 1 there is shown the diffraction pattern of a sample of calcinated ITQ-10 of the composition $SiO_2$.

TABLE 2

| d(Å) | $I/I_0(\%)$ |
|---|---|
| 12.38 | 70 |
| 11.79 | 90 |
| 10.34 | 30 |
| 9.21 | 20 |
| 6.19 | 15 |
| 4.70 | 5 |
| 4.44 | 10 |
| 3.92 | 100 |
| 3.80 | 25 |
| 3.66 | 15 |

TABLE 2-continued

| d(Å) | I/I$_o$(%) |
|------|-----------|
| 3.53 | 10 |
| 3.40 | 15 |
| 3.25 | 15 |
| 3.10 | 20 |
| 2.94 | 5 |
| 2.84 | 5 |
| 2.63 | 5 |
| 2.48 | 5 |
| 2.35 | <5 |

From the viewpoint of chemical composition, ITQ-10 is characterized by having a (Si+Y)/X ratio higher than 10, wherein the element x may be constituted exclusively of Al, and due to its low concentration of connectivity defects (<15%, preferably <6%). Furthermore, ITQ-10 may be synthesized without Al, or another element with oxidation state +3 in which case ITQ-10 is a new polymorphous form of silica of a microporous nature.

The present invention also refers to the method of preparing ITQ-10. This comprises a thermal treatment at a temperature between 80 and 200° C., preferably between 130 and 200° C., of a reaction mixture containing a source of SiO$_2$ (as for example tetraethylorthosilicate, colloidal silica, amorphous silica), an organic cation in the form of a hydroxide, preferably 1,4-diquinuclidinium butane dihydroxide (I), hydrofluoric acid and water. Alternatively, it is possible to use the organic cation in the form of a salt (as for example a halide, preferably chloride or bromide) and to replace the hydrofluoric acid by a fluorine salt, preferably NH$_4$F. The reaction mixture is characterized by its relatively low pH, pH<12 preferably <10, whereby it may also be neutral or slightly acid.

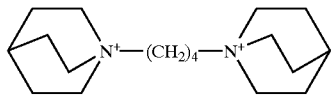

I

Optionally, it is possible to add a source of another tetravalent Y and/or trivadent element X, preferably Ti or Al. The addition of this element may be made before heating the reaction mixture or at an intermediate time during said heating. On occasions, it may be convenient to furthermore introduce, at some stage of the preparation, ITQ-10 crystals (between 0.10 and 15% by weight in respect of the whole of inorganic acids, preferably between 0.05 and 5% by weight) as crystallization promoters (seeding). The composition of the reaction mixture corresponds to the general empirical formula $$rR(OH)_2 : aHF : xX_2O_3 : yYO_2 : SiO_2 : wH_2O$$

wherein X is one or several trivalent elements, preferably Al; Y is one or several tetravalent elements; R is an organic cation, preferably 1,4-diquinuclidinium butane; and the values r, a, x, y, and w are within the ranges
r=R(OH)$_2$/SiO$_2$=0.01–1.01 preferably 0.1–1.0
a=HF/SiO$_2$=0.01–1.0, preferably 0.1–1.0
x=X$_2$O$_3$/SiO$_2$=0–0.05
y=YO$_2$/SiO$_2$=0–0.1
w=H$_2$O/SiO$_2$=0–100, preferably 1–50, more preferably 1–15

The thermal treatment of the reaction mixture may be carried out in a static manner or with agitation of the mixture. Once crystallization has ended, the solid product is separated and dried. The subsequent calcination at temperatures between 400 and 650° C., preferably between 450 and 600° C., produces the decomposition of the organic residues that are occluded within the zeolite, and the exiting thereof and of the fluoride anion whereby the zeolitic channels are left free.

This method of synthesis of the zeolite ITQ-10 has the particularity that it does not require alkaline cations to be introduced into the reaction mixture. As a consequence thereof, R is the only cation that compensates network charges when the zeolite contains a trivalent element within its crystalline network. Thus, a simple calcination to decompose the organic cation leaves the zeolite in an acid form without the need to resort to processes of cationic exchange. Once calcinated, the material thus responds to the general formula

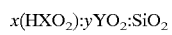

$$x(HXO_2) : yYO_2 : SiO_2$$

wherein x has a value lower than 0.1 whereby it may be equal to zero; y has a value lower than 0.1 and may also be equal to zero; X is a chemical element with oxidation status +3 and Y is a chemical element with oxidation state +4.

EXAMPLES

Example 1

Figure 1:
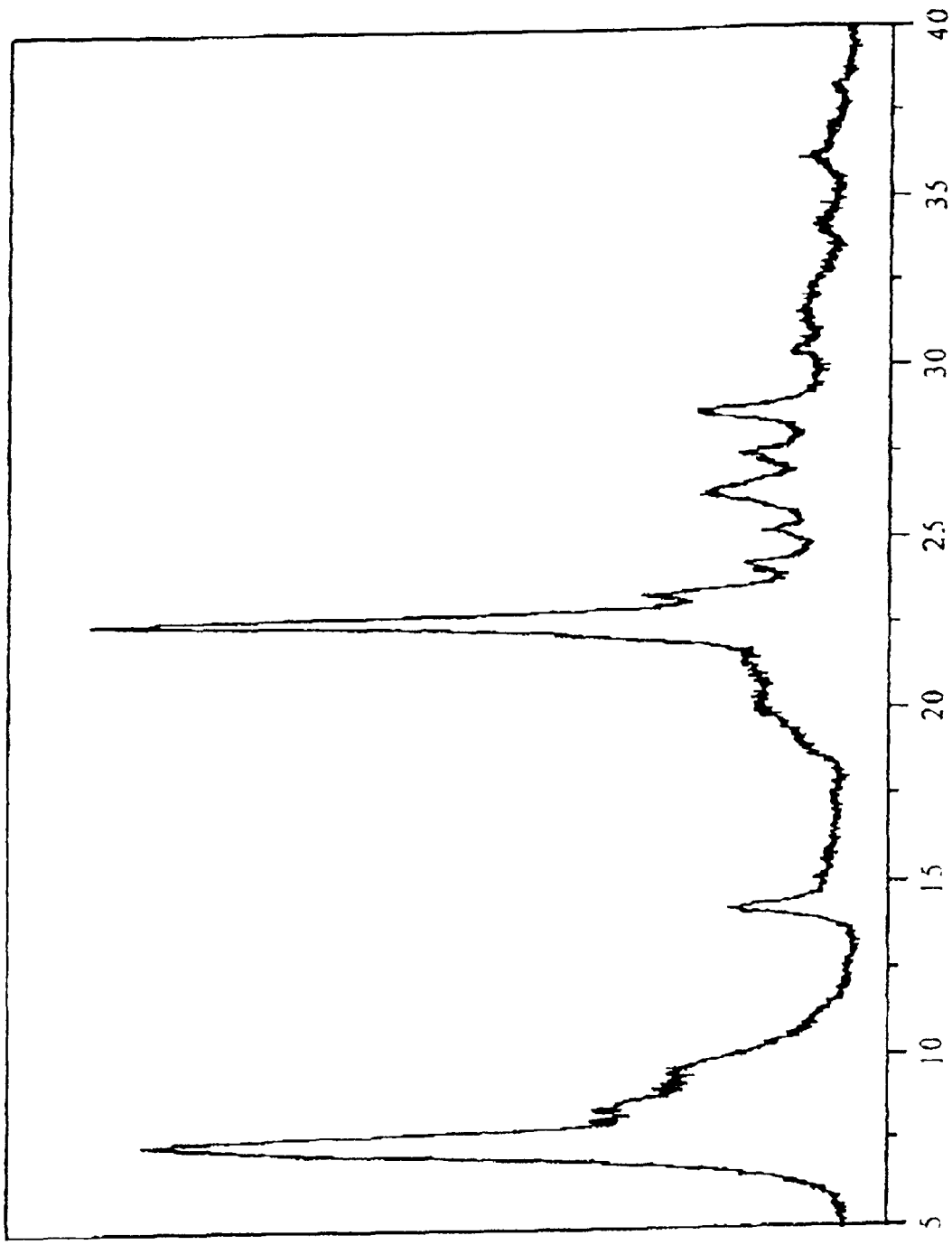
FIG. 1 is an x-ray diffraction pattern for calcined ITQ-10 of the composition SiO$_2$.

This example illustrates the preparation of 1,4-diquinuclidinium butane.

17.30 g of 1,4-dibromobutane, 99% Aldrich, and 100 g ethanol are mixed in a 250 ml flask. Thereafter, 20 g quinuclidine, 97% Aldrich, are added and stirring is maintained for 3 days. After this time has elapsed, ethanol is eliminated by vacuum concentration in a rotary evaporator. The resulting solid is washed with ethyl acetate and afterwards with diethyl ester, whereby 36.14 g are obtained with a yield of 95%. The nuclear magnetic resonance spectrum in D$_2$O indicates that it is the desired product. i.e. bromide of the organic cation 1,4-diquinuclidinium butane. The elemental analysis of the solid is as follows: 5.93% N, 45.55% C, 8.08% H.

The hydroxide form of the structure directing agent is obtained by anionic exchange, whereby Dowex 1 resin (Sigma) that has been previously washed with distilled water up to pH=7. To a solution of 16.3 g of the former product in 41.3 g water, 80.5 g resin is added and left under stirring for approximately 12 hours. After filtering the resin, the solution is titrated with HCl (aq.) using phenolphthalein as indicator, with an efficiency in the exchange of 92.8%. This solution may be concentrated in the rotary evaporator for use thereof in the synthesis of molecular sieves, for example at a concentration of 1N.

Example 2

This example illustrates the preparation of ITO-10 by means of the use of the cation 1,4-diquinuclidinium butane.

On 68.79 g of a solution of 1,4-diquinuclidinium butane hydroxide containing 1,044 hydroxide equivalents in 1000 g, 22.92 tetraethylorthosilicate (TEOS) are added. It is left to evaporate until the complete elimination of ethanol coming from the hydrolysis of the TEOS plus the quantity of water required so that the final composition is the indicated one. 2.79 g of HF in water (46.9% by weight) are added and the mixture is homogenized. The paste obtained is introduced into an autoclave provided with an internal sleeve of polytetrafluoethylene, and heated to 175° C. at the same time that the autoclave is maintained under rotation (60 rpm) during 4 days. The autoclave is then cooled, the contents filtered, the solid washed with water and dried at 100° C. (47.2 g of solid per 100 g gel). The X-ray diffraction pattern shows that the solid is pure ITQ-10. Calcination at 580° C. in air during 3 hours permits elimination of the occluded species.

The composition of the gel is: $SiO_2$:0.25 $R(OH)_2$:0.50 HF; 3.75 $H_2O$.

Example 3

This example illustrates the preparation of Al-ITQ-10 of a ratio Si/Al=50 using the cation 1,4-diquinuclidinium butane.

15.60 g TEOS and 0.31 g aluminium isopropoxide are hydrolized in 33.43 g of a 1,4-diquinuclidinium dihydroxide solution wit a concentration of 1.12 equivalents per 1000 g, an it is left to evaporate in agitation, up to complete elimination of ethanol and part of the water. When 14.18 g of gel remain 1.42 g HF (46.9% by weight) are added homogenizing manually. After subjecting to heating at 175° C. during 11 days, Al-ITQ-10 with a ratio Si/Al=53 is obtained with a yield of 26.27 g per 100 g gel.

The composition of the gel is: $SiO_2$:0.01 $Al_2O_3$:0.25 $R(OH)_2$:0.50 HF:3.75 $H_2O$ Example 4

This example illustrates the preparation of Al-ITQ-10 of a ratio Si/Al 25 using the cation 1,4-diquinuclidinium butane.

15.60 g tetraethylorthosilicate (TEOS) and 0.61 g aluminium isopropoxide are added over 41.60 g of a solution of 1,4-diquinuclidinium butane hydroxide containing 0.90 hydroxide equivalents in 1000 g. It is left to evaporate in agitation, up to complete elimination of the ethanol coming from the hydrolysis of TEOS plus the quantity of water being necessary for the final composition to be the indicated one. 1.50 g of a solution of HF in water (49.8% by weight) are added and the mixture is homogenized. The paste obtained is introduced into an autoclave provided with an inner sleeve of polytetrafluoethylene and is heated to 175° C. at the same time the autoclave is maintained under rotation (60 rpm) during 8 days. The autoclave is then cooled, the contents filtered, the solid washed with water and dried at 100°. The yield is 2.8 g solid per 100 g gel. The X-ray diffraction pattern shows that the solid is pure ITQ-10. Calcination at 580° C. in air during 3 hours permits elimination of the occluded species.

The composition of the gel is: $SiO_2$:0.02 $Al_2O_3$:0.25 $R(OH)_2$:0.50 HF:3.75$H_2O$.

What is claimed is:

1. A microporous crystalline material with an X-ray diffraction pattern concordant with that established in tables I and II for the material as synthesized and after calcination, respectively, and with a chemical composition in calcinated and anhydrous state which may be represented by the following empirical formula $$x(M_{1/n}XO_2):yYO_2:SiO_2$$

wherein x has a value lower than 0.1 to zero; y has a value lower than 0.1 to zero; M is $H^+$ or an inorganic cation of a charge +n; X is a chemical element with oxidation state +3 and Y is a chemical element with oxidation state +4 other than Si.

2. The microporous crystalline material according to claim 1, wherein the chemical composition, in calcinated and anhydrous state, may be represented by the following empirical formula $$x(HXO_2):yYO_2:SiO_2$$

wherein X is a trivalent element, Y is a tetravalent element other than Si, x has a value lower than 0.1 to zero; and y has a value lower than 0.1 to zero.

3. A method for synthesizing the microporous crystalline material of claims 1 or 2, wherein a reaction mixture containing a source of $SiO_2$, 1,4-diquinuclidinium butane R, a source of fluoride anions F, optionally a source of Al and water is subjected to heating with or without agitation to a temperature between 80 and 200° C. until achieving crystallization, and wherein the reaction mixture has a composition in terms of molar oxide ratios, comprised between the ranges $R(OH)_2/SiO_2$=0.01–1.0
$F/SiO_2$=0.01–1.0
$Al_2O_3/SiO_2$=0–0.05
$H_2O/SiO_2$=1–100.

4. A method for synthesizing the microporous material of claims 1 or 2, wherein a reaction mixture containing a source of $SiO_2$, 1,4-diquinuclidinium butane R, a source of fluoride anions F, optionally a source of one or several tetravalent elements Y other than Si and water is subjected to heating with or without agitation to a temperature between 80 and 200° C. until achieving crystallization, and wherein the reaction mixture has a composition in terms of molar oxide ratios, comprised between the ranges $R(OH)_2/SiO_2$=0.01–1.0
$HF/SiO_2$=0.01–1.0
$YO_2/SiO_2$=0–0.1
$H_2O/SiO_2$=1–100.

5. The microporous crystalline material according to claim 1, wherein the composition, in calcinated and anhydrous state, may be represented as $SiO_2$.

6. A method for synthesizing the microporous material of claims 1 or 5, wherein a reaction mixture containing a source of $SiO_2$, 1,4-diquinuclidinium butane R, a source of fluoride anions F, and water is subjected to heating with or without agitation to a temperature between 80 and 200° C. until achieving crystallization, and wherein the reaction mixture has a composition in terms of molar oxide ratios, comprised between the ranges $R(OH)_2/SiO_2$=0.01–1.0
$F/SiO_2$=0.01–1.0
$H_2O/SiO_2$=1–100.

7. The method of claim 4, wherein no alkaline cations are added to the reaction mixture.

8. The method of claim 4, wherein a source of a tetravalent element other than Si, or of a trivalent element, is added during an intermediate step during heating of the reaction mixture.

9. The microporous crystalline material of claim 1, wherein X is Al, Ga, B, or Cr and Y is Ti, Ge, or V.

10. A method for synthesizing microporous crystalline materials, wherein a reaction mixture containing a source of $SiO_2$, 1,4-diquinuclidinium butane R, a source of fluoride anions F, optionally a source of one or several tetravalent elements Y other than Si, optionally a source of one or several trivalent elements X and water is subjected to heating with or without agitation to a temperature between 80 and 200° C. until achieving crystallization, and wherein the reaction mixture has a composition in terms of molar oxide ratios, comprised between the ranges $R(OH)_2/SiO_2=0.01-1.0$
$F/SiO_2=0.01-1.0$
$X_2O_3/SiO_2=0-0.05$
$YO_2/SiO_2=0-0.1$
$H_2O/SiO_2=1-100$.

11. The method of claim 10, wherein a reaction mixture containing a source of $SiO_2$, 1,4-diquinuclidinium butane R, a source of fluoride anions F, optionally a source of one or several trivalent elements X and water is subjected to heating with or without agitation to a temperature between 80 and 200° C. until achieving crystallization, and wherein the reaction mixture has a composition in terms of molar oxide ratios, comprised between the ranges $R(OH)_2/SiO_2=0.01-1.0$
$F/SiO_2=0.01-1.0$
$X_2O_3/SiO_2=0-0.05$
$H_2O/SiO_2=1-100$.

12. The method according to claim 10, wherein the 1,4-diquinuclidinium organic cation is added in hydroxide form or in the form of a mixture of hydroxide and another salt, and the fluoride anion is added in such a manner that the pH of the mixture is equal to or lower than 12 and may be even neutral or slightly acid.

13. The method of claim 12, wherein the salt is a halide salt and the pH is lower than 10 to slightly acidic.

14. The method according to claim 12, wherein the crystalline microporous material has an X-ray diffraction pattern substantially concordant with that established in table I and II for the material as synthesized and after calcination, respectively, and with a chemical composition in calcinated and anhydrous state which may be represented by the following empirical formula

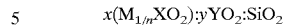

wherein x has a value lower than 0.1 to zero; y has a value lower than 0.1 to zero; M is $H^+$ or an inorganic cation of a charge +n; X is a chemical element with oxidation state +3 and Y is a chemical element with oxidation state +4 other than Si.

15. The method of claim 14, wherein X is Al, Ga, B, or Cr and Y is Ti, Ge, or V.

16. The method of claim 4, wherein an amount of crystalline material is added to the reaction mixture as crystallization promoter, said amount being in the range 0.01 to 15% by weight with respect to the whole of added silica.

17. The method of claim 16, wherein the crystallization promoter is added in an amount of 0.05 to 5% with respect to the total added silica.

18. The method of claim 10, wherein X is Al, Ga, B, or Cr and Y is Ti, Ge, or V.

19. The method of claim 10, wherein the reaction mixture is heated to a temperature of between 130 and 200° C. until achieving crystallization.

20. The method of claim 10, wherein the reaction mixture has a composition in terms of molar oxide ratios, comprised between the ranges $R(OH)_2/SiO_2=0.1-1.0$
$F/SiO_2=0.1-1.0$
$X_2O_3/SiO_2=0-0.05$
$YO_2/SiO_2=0-0.1$
$H_2O/SiO_2=1-15$.

* * * * *